US012192235B2

(12) United States Patent
Rozzo et al.

(10) Patent No.: US 12,192,235 B2
(45) Date of Patent: Jan. 7, 2025

(54) MACHINE LEARNING UNIFORM RESOURCE LOCATOR (URL) CLASSIFIER

(71) Applicant: Proofpoint, Inc., Sunnyvale, CA (US)

(72) Inventors: Steve Rozzo, San Francisco, CA (US); Sarah Solieman, San Francisco, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 221 days.

(21) Appl. No.: 17/712,675

(22) Filed: Apr. 4, 2022

(65) Prior Publication Data

US 2023/0319106 A1 Oct. 5, 2023

(51) Int. Cl.
*H04L 9/40* (2022.01)
*G06F 16/951* (2019.01)
*G06F 16/955* (2019.01)
*G06F 18/2431* (2023.01)
*G06N 20/00* (2019.01)

(52) U.S. Cl.
CPC ........ *H04L 63/1483* (2013.01); *G06F 16/951* (2019.01); *G06F 16/955* (2019.01); *G06F 18/2431* (2023.01); *G06N 20/00* (2019.01)

(58) Field of Classification Search
CPC ............... H04L 63/1483; G06F 16/955; G06F 16/951; G06F 18/2431; G06N 20/00
See application file for complete search history.

(56) References Cited

U.S. PATENT DOCUMENTS

| | | | | | |
|---|---|---|---|---|---|
| 9,178,901 | B2 * | 11/2015 | Xue | ..................... | H04L 63/1483 |
| 11,818,156 | B1 * | 11/2023 | Parikh | ................. | G06F 16/9537 |
| 11,843,622 | B1 * | 12/2023 | Tellez | ................. | H04L 63/1425 |
| 11,882,131 | B1 * | 1/2024 | Wittel | ................. | H04L 63/1425 |
| 11,936,545 | B1 * | 3/2024 | Miskovic | ............ | H04L 43/0894 |
| 2013/0275570 | A1 * | 10/2013 | Treuhaft | ................. | H04L 67/10 709/223 |
| 2014/0280896 | A1 * | 9/2014 | Papakostas | ............. | H04W 4/50 709/224 |
| 2018/0212990 | A1 * | 7/2018 | Kapadia | ............. | H04L 63/1425 |
| 2019/0068616 | A1 * | 2/2019 | Woods | ................. | H04L 63/145 |
| 2020/0252421 | A1 * | 8/2020 | Pendergast | .......... | H04L 63/1433 |
| 2021/0105302 | A1 * | 4/2021 | Prakash | ................. | G06N 20/00 |
| 2021/0203676 | A1 * | 7/2021 | Pendse | ............... | H04L 63/1416 |
| 2022/0272125 | A1 * | 8/2022 | Tora | ..................... | H04L 63/168 |
| 2022/0414206 | A1 * | 12/2022 | Hinkle | ................. | G06F 16/951 |
| 2023/0040895 | A1 * | 2/2023 | Hegli | ..................... | G06N 20/10 |

(Continued)

*Primary Examiner* — Stephen T Gundry

(74) *Attorney, Agent, or Firm* — Banner & Witcoff, Ltd.

(57) ABSTRACT

Aspects of the disclosure relate to URL classification. A computing platform may receive, from an enterprise user device, a request to evaluate a URL. The computing platform may execute one or more feature enrichment actions on the URL to identify one or more data points corresponding to the URL, which may include crawling the URL to extract metadata for the URL. The computing platform may input, into a URL classification model, the one or more data points corresponding to the URL, which may cause the URL classification model to output a maliciousness score indicative of a degree to which the URL is malicious. The computing platform may send, to the enterprise user device, a malicious score notification and one or more commands directing the enterprise user device to display the malicious score notification, which may cause the enterprise user device to display the malicious score notification.

20 Claims, 7 Drawing Sheets

(56) References Cited

U.S. PATENT DOCUMENTS

| | | | |
|---|---|---|---|
| 2023/0350966 A1* | 11/2023 | Zheng | G06F 16/955 |
| 2023/0370495 A1* | 11/2023 | Desai | H04L 63/1425 |
| 2023/0412626 A1* | 12/2023 | Wright | H04L 41/16 |
| 2024/0028721 A1* | 1/2024 | Ma | G06F 21/53 |
| 2024/0031383 A1* | 1/2024 | Szurdi | H04L 63/20 |
| 2024/0039954 A1* | 2/2024 | Shete | H04L 63/1425 |
| 2024/0070494 A1* | 2/2024 | Polleri | G06N 5/046 |
| 2024/0073245 A1* | 2/2024 | Narayanaswamy | H04L 63/1425 |

* cited by examiner

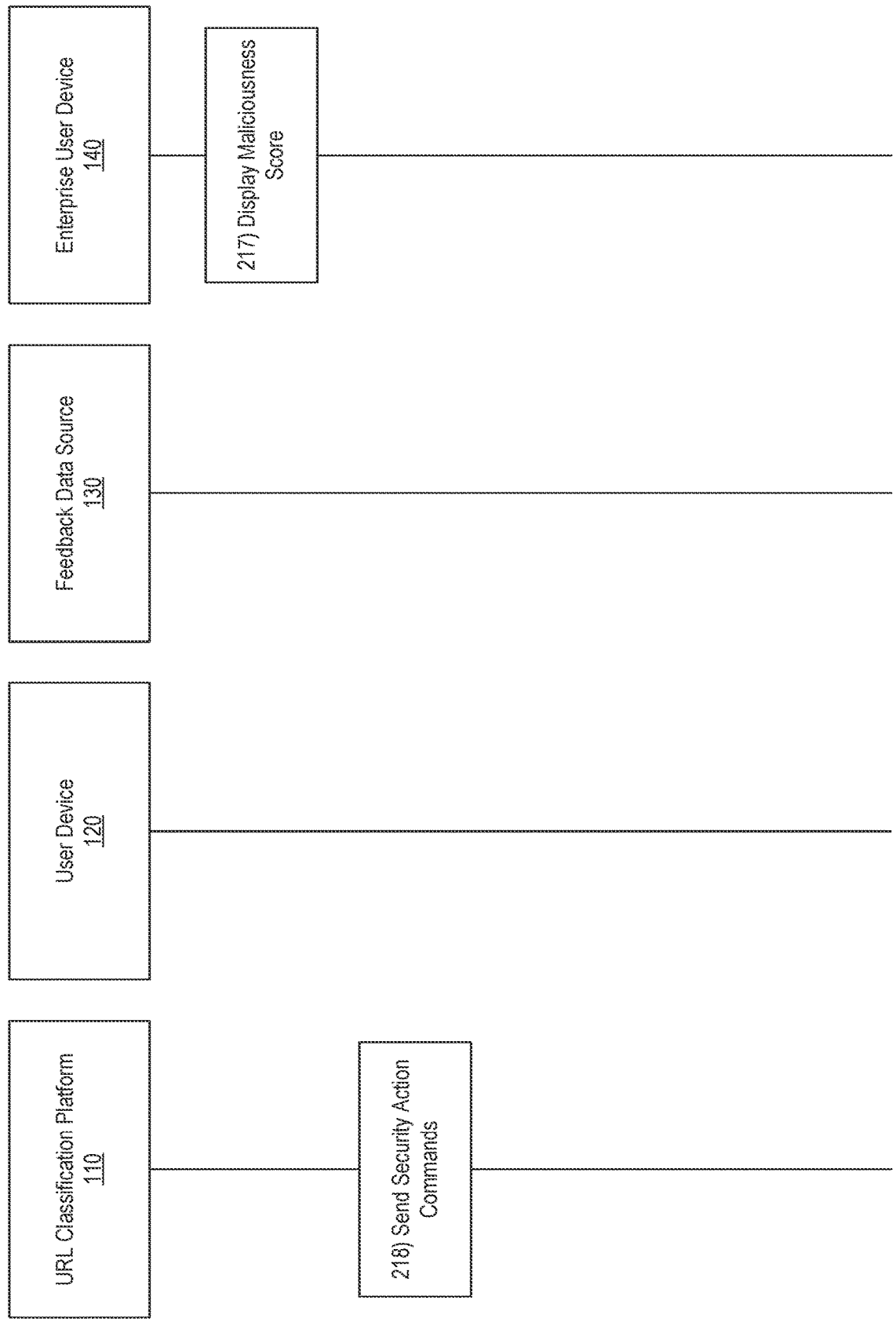

MACHINE LEARNING UNIFORM RESOURCE LOCATOR (URL) CLASSIFIER

TECHNICAL FIELD

Aspects of the disclosure relate to computer software and hardware for using machine learning in uniform resource locator (URL) classification applications. In particular, one or more aspects of the disclosure relate to classifying malicious URLs using feature extraction and machine learning.

BACKGROUND

Increasingly, organizations face various cybersecurity threats that often arise from links to malicious URLs that are embedded in inbound messages. Various methods of analysis have been developed to combat these threats. It remains difficult, however, to efficiently and effectively identify such malicious links, particularly in an automated manner. This is particularly true in circumstances where limited context is provided with the link. In these instances, for example, costly and time consuming manual review must often be performed for accurate classification. Attempts to integrate such analysis techniques into efficient and effective automated processes present various technical challenges, particularly when trying to balance enterprise network security against the optimal consumption of computing resources, such as processing power and network bandwidth.

SUMMARY

Aspects of the disclosure provide technical solutions that overcome one or more of the technical problems described above and/or other technical challenges. For instance, one or more aspects of the disclosure relate to classifying URLs using machine learning.

In accordance with one or more embodiments, a computing platform having at least one processor, a communication interface, and memory may receive, from an enterprise user device, a request to evaluate a uniform resource locator (URL). The computing platform may execute one or more feature enrichment actions on the URL to identify one or more data points corresponding to the URL, which may include crawling the URL to extract metadata for the URL. The computing platform may input, into a URL classification model, the one or more data points corresponding to the URL, which may cause the URL classification model to output a maliciousness score indicative of a degree to which the URL is malicious. The computing platform may send, to the enterprise user device, a malicious score notification and one or more commands directing the enterprise user device to display the malicious score notification, which may cause the enterprise user device to display the malicious score notification.

In one or more instances, executing the one or more feature enrichment actions may include extracting information indicating whether or not a protocol of the URL requires a secure connection. In one or more instances, executing the one or more feature enrichment actions may include extracting information corresponding to one or more redirects of the URL, and the information may include one or more of: a number of redirects triggered, a redirect destination, a type of redirection, a number of URLs accessed before a crawl reaches a final URL, or a number of hops.

In one or more instances, executing the one or more feature enrichment actions may include: 1) extracting a domain age corresponding to the URL; 2) comparing the domain age to a threshold domain age; 3) if the domain age exceeds the threshold domain age, classifying the URL into a first category; and 4) if the domain age does not exceed the threshold domain age, classifying the URL into a second category.

In one or more instances, executing the one or more feature enrichment actions may include extracting block rate information corresponding to the URL, where the block rate information indicates a number of times the URL was blocked and a number of times the URL was unblocked. In one or more instances, executing the one or more feature enrichment actions may include extracting promotion level information corresponding to the URL.

In one or more instances, executing the one or more feature enrichment actions may include extracting information indicating whether one or more of an IPv4 or an IPv6 network address is present in a redirect chain for the URL. In one or more instances, the computing platform may compare the maliciousness score to a predetermined maliciousness threshold. Based on identifying that the maliciousness score exceeds the predetermined maliciousness threshold, the computing platform may send one or more commands to a network computing device directing the network computing device to perform one or more network security actions, which may cause the network computing device to perform the one or more network security actions.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for using machine learning for URL classification in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

As a brief introduction to the concepts described further below, one or more aspects of the disclosure relate to systems and methods for determining whether a website is malicious in nature. Unlike other classification algorithms, this concept involves evaluating characteristics, metadata, and/or other information associated with crawling to a given website to determine if the website is malicious, rather than looking at the content of the website or the URL string itself. For example, some malicious websites may force a browser to perform specific actions during a crawl to page, as these actions may obfuscate the malicious intent of a given malicious site. In some instances, these actions may be actions that legitimate sites might not force upon a browser, as they may be unnecessary. By profiling the crawl to a site, the systems and methods described herein provide a way of classifying the site as potentially malicious.

Figure 1:
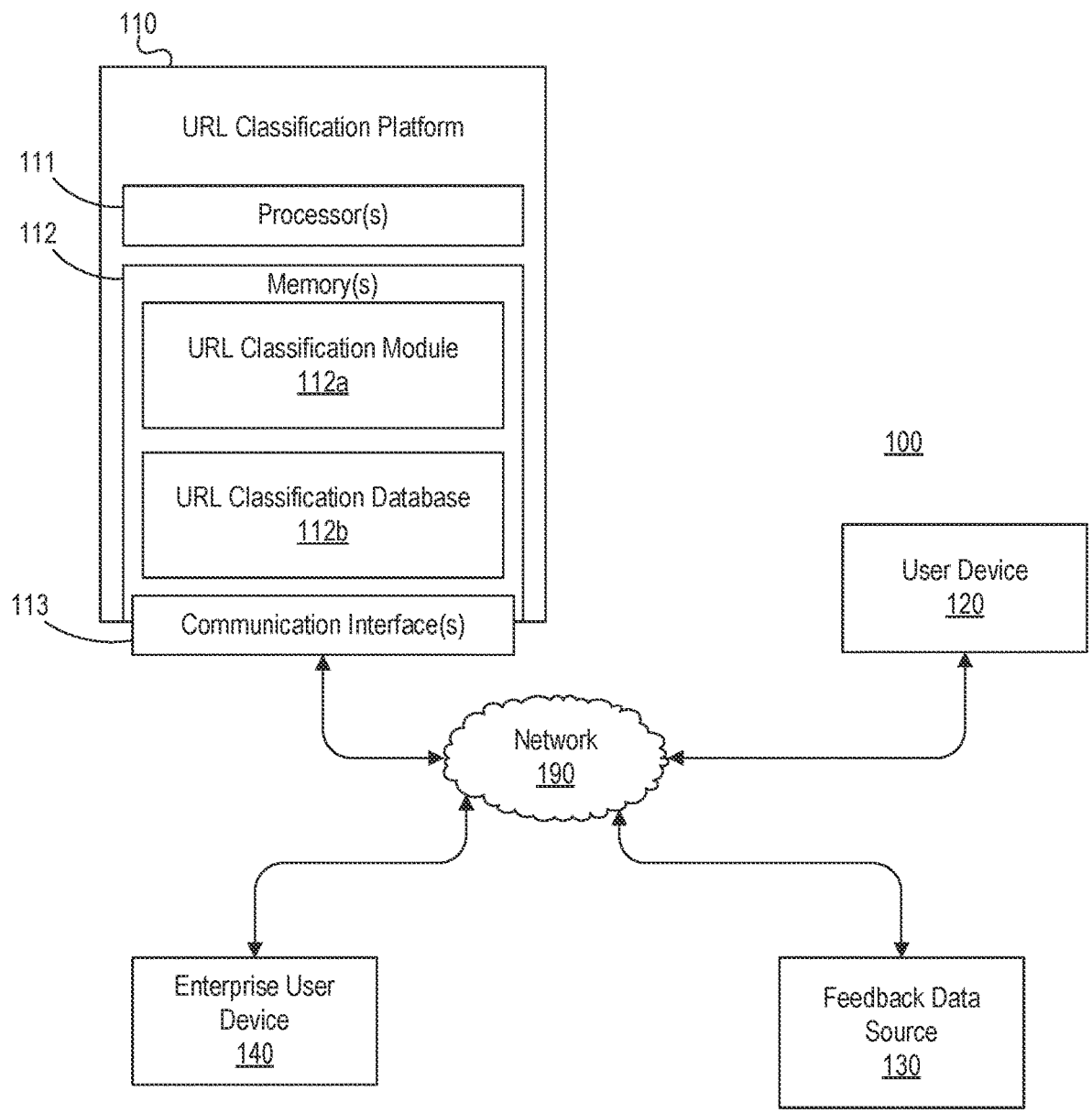
FIG. 1 depicts an illustrative operating environment for using machine learning for URL classification in accordance with one or more example embodiments.

FIG. 1 depicts an illustrative operating environment for using machine learning for URL classification in accordance with one or more example embodiments. Referring to FIG. 1, computing environment 100 may include various computer systems, computing devices, networks, and/or other operating infrastructure. For example, computing environment 100 may include a URL classification platform 110, a user device 120, feedback data source 130, enterprise user device 140, and a network 190.

Network 190 may include one or more wired networks and/or one or more wireless networks that interconnect URL classification platform 110, user device 120, feedback data source 130, enterprise user device 140, and/or other computer systems and/or devices. In addition, each of URL classification platform 110, user device 120, feedback data source 130, and enterprise user device 140, may be special purpose computing devices configured to perform specific functions, as illustrated in greater detail below, and may include specific computing components such as processors, memories, communication interfaces, and/or the like.

URL classification platform 110 may include one or more processor(s) 111, one or more memory(s) 112, and one or more communication interface(s) 113. In some instances, URL classification platform 110 may be made up of a plurality of different computing devices, which may be distributed within a single data center or a plurality of different data centers. In these instances, the one or more processor(s) 111, one or more memory(s) 112, and one or more communication interface(s) 113 included in URL classification platform 110 may be part of and/or otherwise associated with the different computing devices that form URL classification platform 110.

In one or more arrangements, processor(s) 111 may control operations of URL classification platform 110. Memory(s) 112 may store instructions that, when executed by processor(s) 111, cause URL classification platform 110 to perform one or more functions, as discussed below. Communication interface(s) 113 may include one or more wired and/or wireless network interfaces, and communication interface(s) 113 may connect URL classification platform 110 to one or more networks (e.g., network 190) and/or enable URL classification platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause URL classification platform 110 to perform various functions) and/or databases (which may, e.g., store data used by URL classification platform 110 in performing various functions). For example, memory(s) 112 may store and/or otherwise provide URL classification module 112a and URL classification database 112b. In some instances, URL classification module 112a may store instructions that cause URL classification platform 110 to apply feature extraction, feature analysis, and/or execute one or more other functions described herein to perform URL classification. Additionally, URL classification database 112b may store data that is used by URL classification platform 110 to perform feature analysis for URL classification, and/or in executing one or more other functions described herein.

User device 120 may be configured to be used by an individual who may, e.g., be a client or customer of an enterprise organization affiliated with or otherwise receiving services from the URL classification platform 110. For example, the individual may use the user device 120 to provide feedback indicating whether a particular URL should or should not be blocked. In some instances, the user device 120 may be one of a mobile device, smartphone, tablet, laptop computer, desktop computer, and/or other device configured for electronic messaging. In some instances, user device 120 may be configured to present one or more user interfaces (e.g., which may, e.g., enable the individual to provide the above described feedback, and/or other user input).

Feedback data source 130 may be and/or include one or more computing devices (e.g., servers, server blades, and/or other systems). In some instances, the feedback data source 130 may be configured to communicate with the user device 120 to receive feedback data. Additionally, the feedback data source 130 may be configured to communicate with the URL classification platform 110 to provide the feedback data, which may be used to train a URL classification model.

Enterprise user device 140 may be configured to be used by an individual who may, e.g., be an employee of an enterprise organization affiliated with or otherwise receiving services from the URL classification platform 110. For example, the employee may use the enterprise user device 140 to request classification of a URL (e.g., whether or not the URL is malicious). In some instances, the enterprise user device 140 may be one of a mobile device, smartphone, tablet, laptop computer, desktop computer, and/or other device configured for electronic messaging. In some instances, enterprise user device 140 may be configured to present one or more user interfaces (which may, e.g., enable the employee to provide the above described requests, and/or other user input).

Figure 2A:
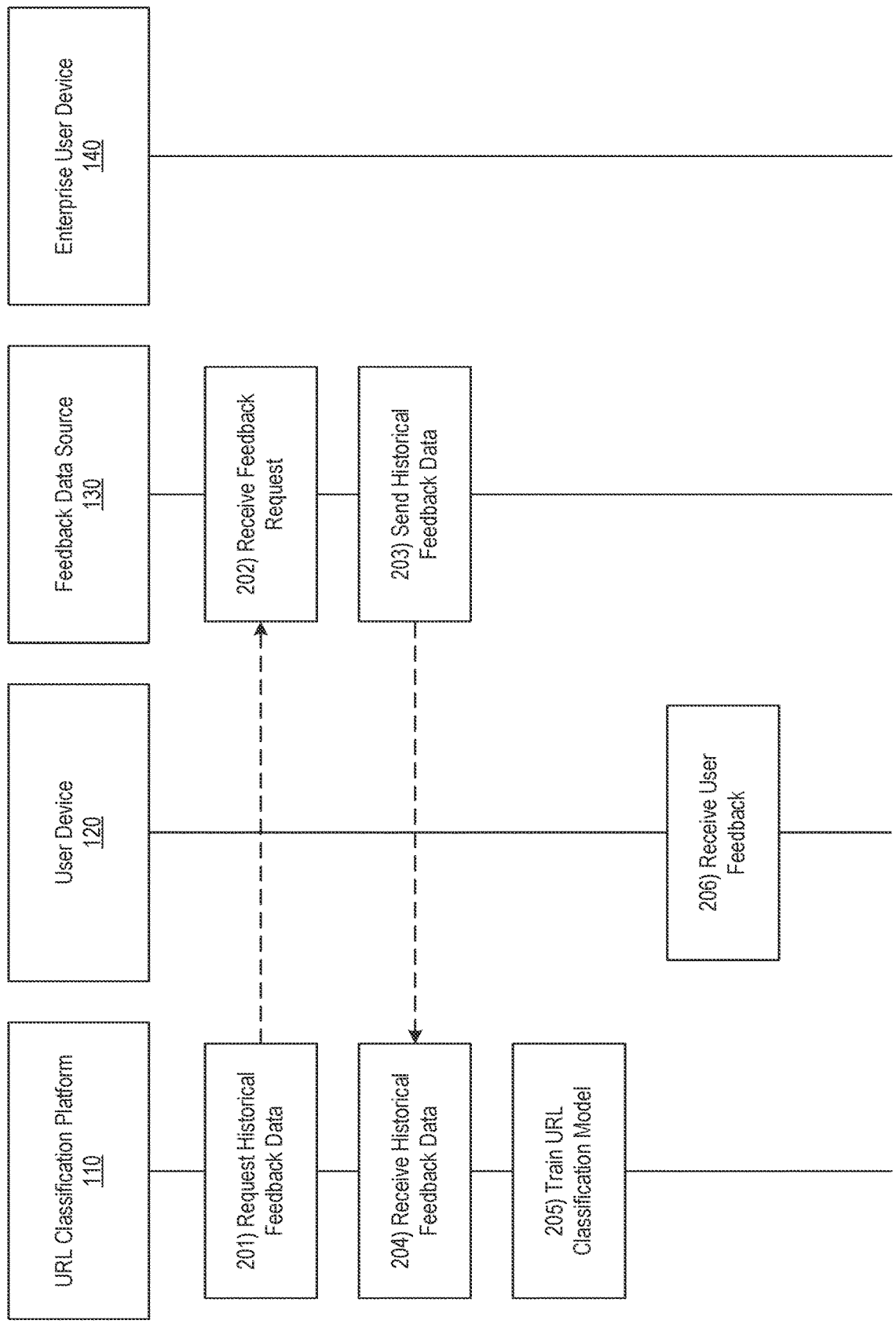

FIGS. 2A-2D depict an illustrative event sequence for using machine learning for URL classification in accordance with one or more example embodiments. Referring to FIG. 2A, at step 201, the URL classification platform 110 may send a request for historical feedback data to the feedback data source 130. For example, the URL classification platform 110 may request historical information indicating whether or not various URLs were identified as blocked or not, and various other information associated with these URLs. In some instances, the URL classification platform 110 may send the historical feedback data request while a data connection (e.g., a wired and/or wireless network connection) is established with the feedback data source 130. At step 202, the feedback data source 130 may receive the feedback request sent at step 201.

At step 203, the feedback data source 130 may send the historical feedback data to the URL classification platform 110. In some instances, in sending the historical feedback data, the feedback data source 130 may send user input (e.g., indicating whether or not a URL should be blocked), whether or not the URL is securely connected, redirect information, hop numbers, domain age information, block rate information, promotion level information, and/or other information corresponding to URLs. In some instances, the feedback data source 130 may send the historical feedback data to the URL classification platform 110 while a data connection (e.g., a wired and/or wireless network connection) is established. At step 204, the URL classification platform 110 may receive the historical feedback data sent at step 203.

At step 205, the URL classification platform 110 may train a URL classification model using the historical feedback data. For example, the URL classification platform 110 may train a machine learning model to output a maliciousness score for a particular URL. To do so, the URL classification platform 110 may train the machine learning model to analyze various URL features in identifying the maliciousness score.

In some instances, the URL classification platform 110 may also train the machine learning model to identify the maliciousness score based on a hop distance and/or number of redirects. For example, the URL classification platform 110 may establish a hop distance threshold (which may, e.g., be refined/dynamically modified over time). In these instances, the URL classification platform 110 may provide a lower maliciousness score if the hop distance does not exceed the hop distance threshold, and a higher maliciousness score if the hop distance does meet or exceed the hop distance threshold (e.g., because a legitimate URL might typically not have as many hops).

Additionally or alternatively, the URL classification platform 110 may train the machine learning model to identify the maliciousness score based on a domain age. For example, the URL classification platform 110 may establish a domain age threshold (which may, e.g., be refined/dynamically modified over time). In these instances, the URL classification platform 110 may identify a lower maliciousness score if the domain age meets or exceeds the domain threshold (e.g., as older domains may be less likely to be malicious) and a higher maliciousness score if the domain age does not exceed the domain age threshold.

Additionally or alternatively, the URL classification platform 110 may train the machine learning model to identify the maliciousness score based on URL distinctiveness. For example, the machine learning model may output a lower maliciousness score if the URLs in a particular redirect chain are more similar, and a higher maliciousness score if the URLs in the redirect chain are more distinct.

Additionally or alternatively, the URL classification platform 110 may train the machine learning model to identify the maliciousness score based on a block rate for the URL (e.g., a rate of how often a URL was blocked or unblocked). For example, the machine learning model may establish a block rate threshold (which may, e.g., be refined/dynamically modified over time), and may compare the block rate for the URL to the block rate threshold. In these instances, the machine learning model may be trained to output a lower maliciousness score if the block rate does not exceed the block rate threshold, and a higher maliciousness score if the block rate meets or exceeds the block rate threshold (e.g., more blocks may mean that the URL is more likely malicious).

Additionally or alternatively, the URL classification platform 110 may train the machine learning model to identify the maliciousness score based on manual classifications of the URL. For example, the URL classification platform 110 may train the machine learning model to identify the maliciousness score based on various manual classifications of URLs that are provided to the machine learning model, which may, e.g., indicate how malicious a URL appears based on these manual classifications.

Additionally or alternatively, the URL classification platform 110 may train the machine learning model to identify a network address score based on whether or not IPv4 or IPv6 network addresses are present in the redirect chain for the URL. In these instances, the machine learning model may be trained to output a higher maliciousness score if an IPv4 or IPv6 address is present than if such an address is not present.

Additionally or alternatively, the URL classification platform 110 may also train the machine learning model to identify the maliciousness score based the presence of top-level domain names in each URL found in the redirect chain. In these instances, the URL classification platform 110 may provide a lower maliciousness score if the number of top-level domain names in the redirect chain not exceed a top-level domain threshold, and a higher maliciousness score if the number of top-level domain names in the redirect chain does meet or exceed the top-level domain threshold (e.g., because a legitimate URL might typically not have as many top-level domains in the URLs found in the redirect chain).

Additionally or alternatively, the URL classification platform 110 may also train the machine learning model to identify the maliciousness score based the quantity of subdomains in a final landing page. In these instances, the URL classification platform 110 may provide a lower maliciousness score if the quantity of subdomains in the final landing page not exceed a subdomain threshold, and a higher maliciousness score if the quantity of subdomains in the final landing page does meet or exceed the subdomain threshold (e.g., because a legitimate URL might typically not have as many subdomains on the final landing page).

In some instances, the URL classification platform 110 may train the machine learning model to apply various weights to each of the above described factors and subsequently compute the maliciousness score based on the above described factors. In some instances, the URL classification platform 110 may dynamically modify/refine these weights based on additional data received, output information, user input, and/or other information.

At step 206, the user device 120 may receive feedback input. For example, the user device 120 may receive feedback from a user indicating that a URL should be blocked, or otherwise appears to be malicious. In some instances, in receiving the feedback input, the user device 120 may receive information correctly identifying a URL as malicious or not. However, in other instances, the user device 120 may receive information that is a false positive or false negative. Accordingly, an enterprise (e.g., associated with the URL classification platform 110 and/or enterprise user device 140) may be responsible for interpreting this feedback.

Figure 2B:
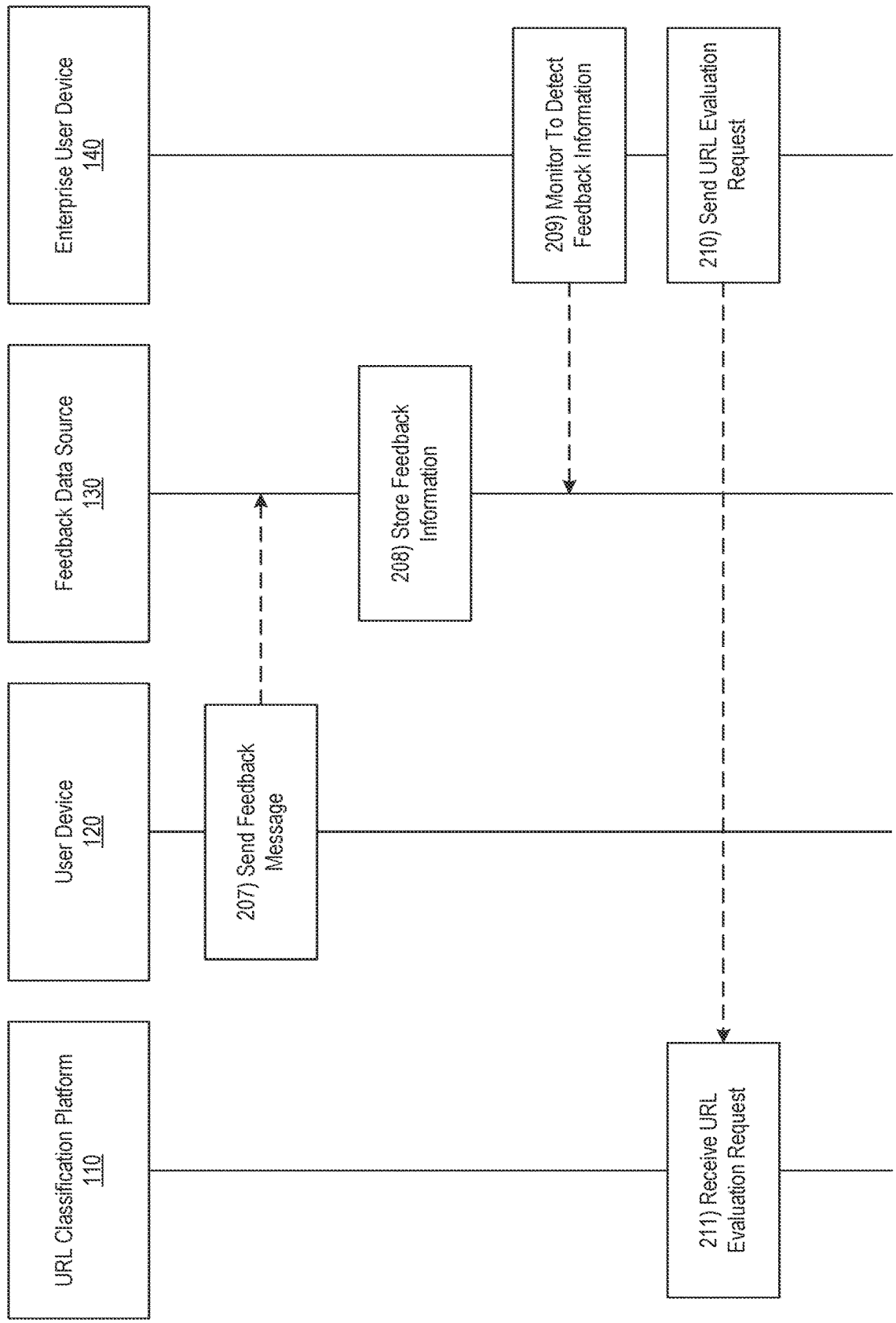

Referring to FIG. 2B, at step 207, the user device 120 may send a feedback message, which may include the feedback input received at step 206, to the feedback data source 130. In some instances, the user device 120 may send this feedback message while a data connection (e.g., a wired and/or wireless network connection) is established with the feedback data source 130.

At step 208, the feedback data source 130 may store the feedback information. For example, the feedback data source 130 may store the feedback information along with the historical feedback data that was previously provided to the URL classification platform 110 for purposes of training the machine learning model.

At step 209, the enterprise user device 140 may monitor the feedback data source 130 to detect new feedback information (e.g., the feedback information stored at step 208). At step 210, after detecting new feedback information, the enterprise user device 140 may send a URL evaluation request to the URL classification platform 110, which may e.g., request evaluation of the URL to identify a corresponding level of maliciousness (which may, e.g., then be used to verify the feedback information). In some instances, the enterprise user device 140 may send the URL evaluation request to the URL classification platform 110 while a data connection (e.g., a wired and/or wireless network connection) is established with the URL classification platform 110.

At step 211, the URL classification platform 110 may receive the URL evaluation request sent at step 210. In some instances, the URL classification platform 110 may identify a confidence level corresponding to a classification of the URL based on historical feedback data. For example, the URL classification platform 110 may identify whether the URL was classified as malicious more than 90% of the time. If so, the URL classification platform 110 may identify, without the need to perform further classification, that the feedback information indicating that this URL is malicious is accurate. In these instances, the remaining steps might not be necessary (or at least the URL classification platform 110 may skip the below described analysis and proceed to step 218. If the URL classification platform 110 does not identify a confidence level that exceeds this threshold, however, it may proceed to step 212 to classify the URL.

Figure 2C:
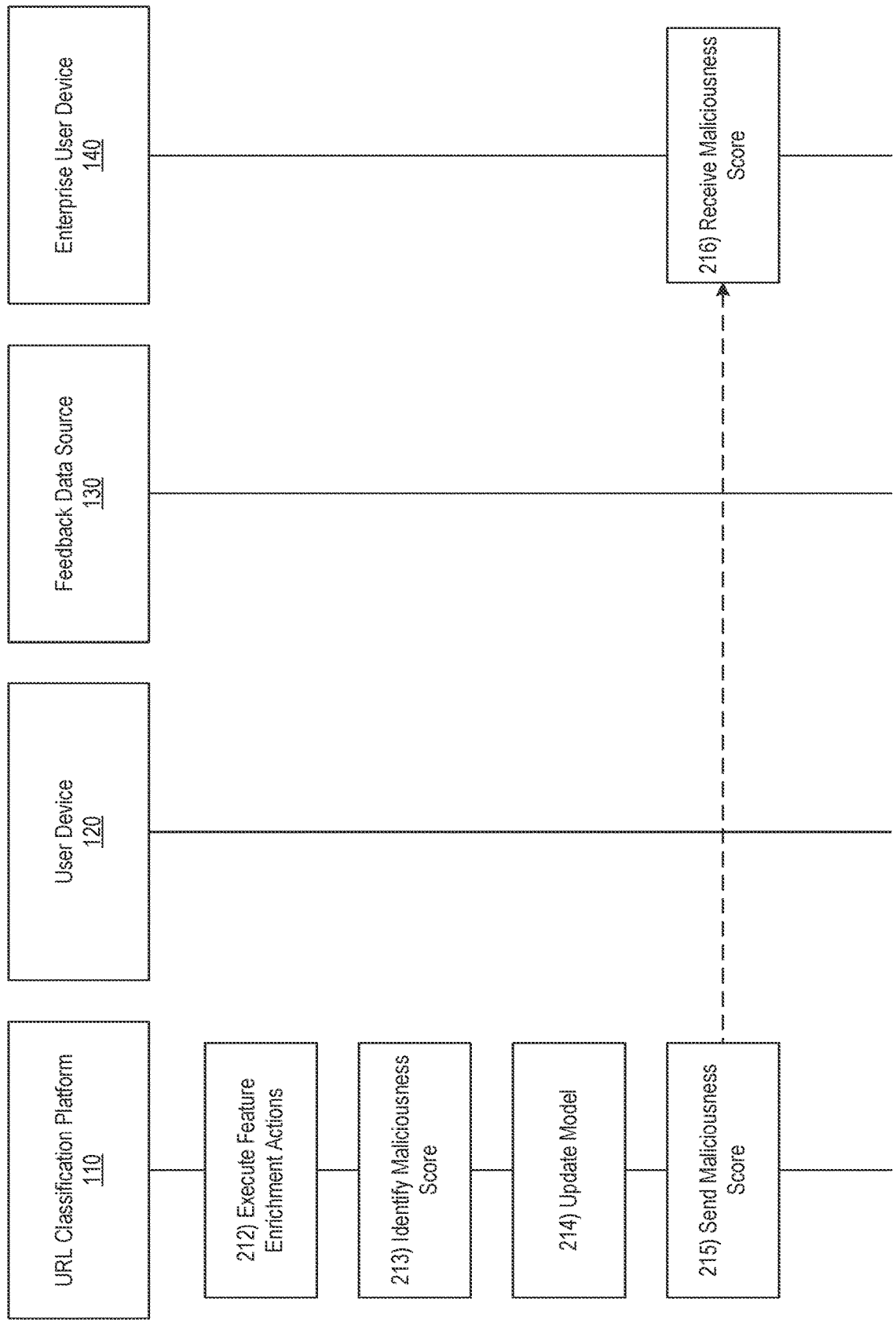

Referring to FIG. 2C, at step 212, the URL classification platform 110 may execute one or more feature enrichment actions to obtain feature information that may be input into the machine learning model to produce the maliciousness score. In some instances, in executing the one or more feature enrichment actions, the URL classification platform 110 may crawl the identified URL and extract various information. For example, in some instances, malicious URLs may attempt to conceal or otherwise obscure certain information during a crawl. The URL classification platform 110 may observe behavior of the URL during the crawl, and use this behavior as an input into the machine learning model.

More specifically, in some instances, the URL classification platform 110 may extract information associated with the protocol of the URL. For example, the URL classification platform 110 may create one or more data points indicating whether or not the protocol of the URL requires a secure connection.

In some instances, in executing the one or more feature enrichment actions, the URL classification platform 110 may extract information associated with one or more redirects. For example, the URL classification platform 110 may create one or more data points corresponding to different redirects triggered by the browser. In doing so, the URL classification platform 110 may capture data indicative of what the URL redirect does, how many other URLs are accessed before the crawl concludes at the final URL that is to be presented by the browser, and/or other information.

In some instances, in executing the one or more feature enrichment actions, the URL classification platform 110 may extract information associated with domain age. For example, the URL classification platform 110 may create one or more data points indicative of how long the domain corresponding to the URL has been in existence. In some instances, the URL classification platform 110 may also classify the URL into different categories (e.g., a domain age that is greater than a threshold number of months may fall into one category and a domain age that is equal to or less than the threshold may fall into a different category). In these instances, the URL classification platform 110 may dynamically adjust these domain age classifications or categories based on observations and/or other measurements.

In some instances, in executing the one or more feature enrichment actions, the URL classification platform 110 may extract information associated with distinctness. For example, the URL classification platform 110 may capture data indicative of whether or not the URLs within the redirect chain are relatively distinct or unique relative to one another.

In some instances, in executing the one or more feature enrichment actions, the URL classification platform 110 may extract information associated with block rate. For example, the URL classification platform 110 may indicate how many time a URL was blocked or unblocked by one or more other systems.

In some instances, in executing the one or more feature enrichment actions, the URL classification platform 110 may extract information associated with manual classifications. For example, the URL classification platform 110 may capture data indicating a status that is manually assigned to the URL in one or more other systems.

In some instances, in executing the one or more feature enrichment actions, the URL classification platform 110 may extract information associated with the presence of IPv4 or IPv6 network addresses in the redirect chain (as the presence of such numerical IP addresses in the redirect chain, in the absence of a fully qualified domain name, may be an indicator that the URL is malicious).

In some instances, in executing the one or more feature enrichment actions, the URL classification platform 110 may extract information associated with the presence of top-level domain names in each URL in the redirect chain (as the presence of an excessive number of such top-level domain names in the redirect chain may be an indicator that the URL is malicious).

In some instances, in executing the one or more feature enrichment actions, the URL classification platform 110 may extract information associated with the quantity of subdomains in the final landing page (as the presence of an excessive number of such subdomains in the final landing page may be an indicator that the URL is malicious).

At step 213, the URL classification platform 110 may input the features/information identified at step 212 into the machine learning model (e.g., trained at step 205). The machine learning model may compare the information to the historical feedback data and/or various thresholds as described above to identify an overall score indicating a maliciousness of the URL a scale of 0 to 1 with 1 being the most malicious and 0 being the least malicious. In some instances, the machine learning model may compute the weight of the various features to identify a maliciousness score, indicating a maliciousness of the URL on a scale of 0 to 1, with 1 being the most malicious and 0 being the least malicious. Additionally or alternatively, in identifying the maliciousness score, the machine learning model may identify a score indicating a likelihood or confidence that the URL is malicious on a scale of 0 to 1, with 1 being the most likely and 0 being the least likely. In some instances, in performing this classification, the URL classification platform 110 may perform a binary classification using a gradient boosting decision tree algorithm. In some instances, a score of 0.5 or less may be treated as indeterminate/uncertain by the URL classification platform 110, whereas scores between 0.5 and 1 may indicate a degree of identified maliciousness for the URL. In some instances, in performing the classification, the URL classification platform 110 may distinguish between various types of attacks such as phishing messages, malicious messages, drive by download messages, and/or other types.

In doing so, the URL classification platform 110 may identify potentially malicious sites by extracting and analyzing features associated with crawling a URL to classify a given site as potentially malicious (e.g., rather than looking at the content of a site or the URL string itself). This may be particularly useful in instances where minimal context is provided for the URL (i.e., where the URL is including in a text message, email, or other message that may be space/size constrained and might not include much context for the URL).

At step 214, the URL classification platform 110 may update the machine learning model based on the maliciousness score identified at step 213 and the corresponding analysis (e.g., this information may be fed back into the model as further data that may be used to inform future analysis). At step 215, the URL classification platform 110 may send the maliciousness score to the enterprise user device 140. In some instances, the URL classification platform 110 may also send one or more commands directing the enterprise user device 140 to display the maliciousness score. In some instances, the URL classification platform 110 may communicate with the enterprise user device 140 while a data connection (e.g., a wired and/or wireless network connection) is established between the devices.

At step 216, the enterprise user device 140 may receive the maliciousness score sent at step 215. In some instances, the enterprise user device 140 may also receive the one or more commands directing the enterprise user device 140 to display the maliciousness score.

Figure 4:
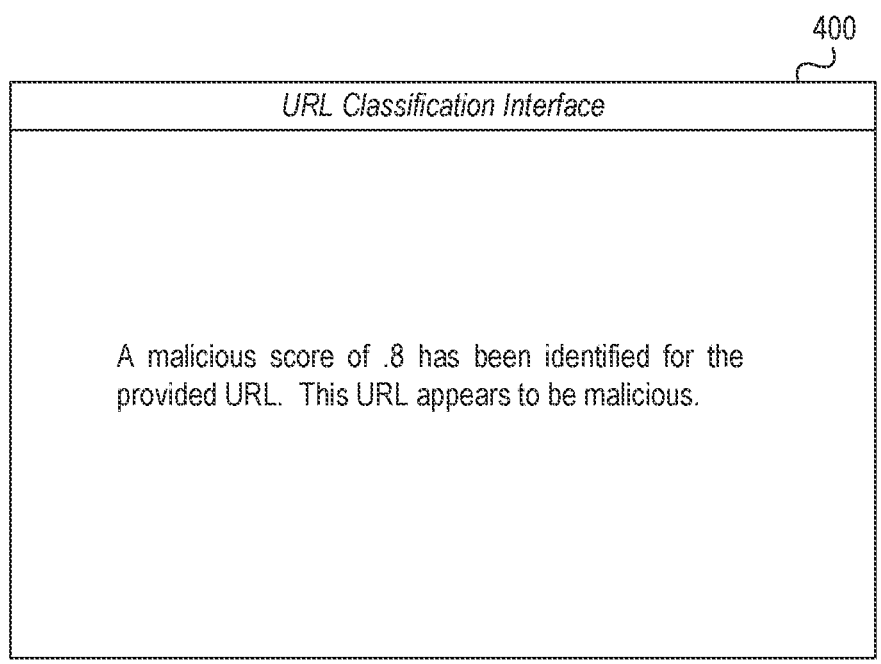
FIG. 4 depicts an illustrative user interface for using machine learning for URL classification in accordance with one or more example embodiments.

Referring to FIG. 2D, at step 217, based on or in response to the one or more commands directing the enterprise user device 140 to display the maliciousness score, the enterprise user device 140 may display the maliciousness score. For example, the enterprise user device 140 may display a graphical user interface similar to graphical user interface 400, which is illustrated in FIG. 4.

At step 218, the URL classification platform 110 may send one or more commands directing one or more systems/devices to perform one or more network security actions based on the maliciousness score. In some instances, the URL classification platform 110 may cause performance of various actions based on the maliciousness score identified (e.g., a first action if the maliciousness score is between a first, lower, threshold and second, higher, threshold, and a second, more severe, action if the maliciousness score exceeds the second threshold). For example, in sending the one or more commands directing the one or more systems/devices to perform the one or more network security actions, the URL classification platform 110 may direct a routing system or gateway device to block a site and/or terminate a connection to a page. Additionally or alternatively, in sending the one or more commands directing the one or more systems/devices to perform the one or more network security actions, the URL classification platform 110 may report the URL to a device used by a system administrator, security analyst, and/or other enterprise employee.

The steps described in the illustrative event sequence herein may be performed in any alternative sequence or order without departing from the scope of the disclosure. Furthermore, the above described systems, event sequence, and methods may be applied in any messaging contexts (e.g., text messages, emails, and/or other messages) without departing from the scope of the disclosure.

Figure 3:
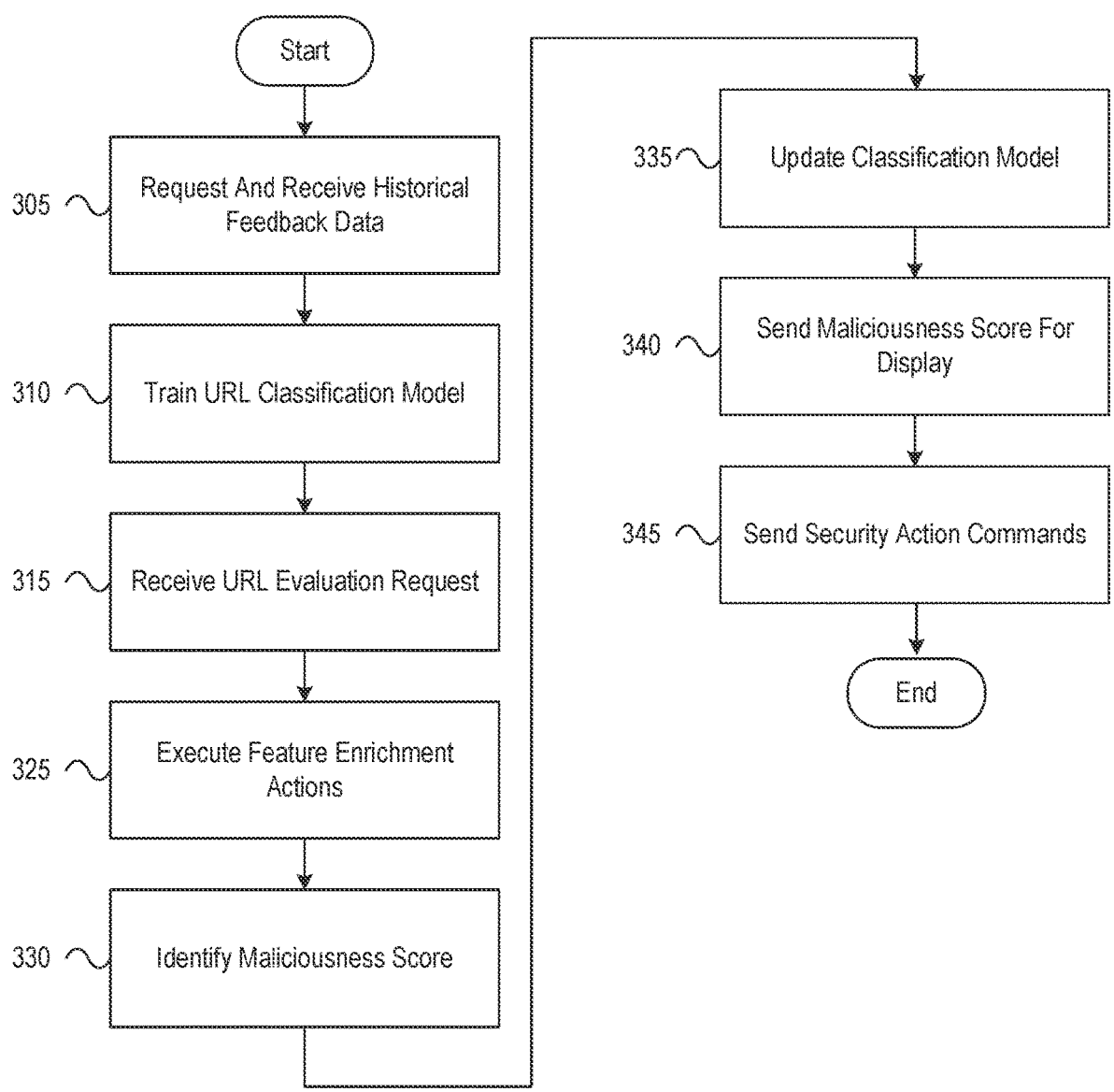
FIG. 3 depicts an illustrative method for using machine learning for URL classification in accordance with one or more example embodiments.

FIG. 3 depicts an illustrative method for using machine learning for URL classification in accordance with one or more example embodiments. Referring to FIG. 3, at step 305, a computing platform having at least one processor, a communication interface, and memory may request and receive historical feedback data. At step 310, the computing platform may use the historical feedback data to train a URL classification model. At step 315, the computing platform may receive a URL evaluation request. At step 325, the computing platform may execute one or more feature enrichment actions on the request URL to obtain feature information. At step 330, the computing platform may input the feature information into the URL classification model to identify a maliciousness score. At step 335, the computing platform may update the URL classification model based on the maliciousness score. At step 340 the computing platform may send the maliciousness score to an enterprise user device for display. At step 345, the computing platform may send one or more security action commands prompting one or more systems/devices to perform a security action based on the maliciousness score.

It should be understood that the analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
    at least one processor;
    a communication interface communicatively coupled to the at least one processor; and
    memory storing computer-readable instructions that, when executed by the at least one processor, cause the computing platform to:
        receive, from an enterprise user device, a request to evaluate a uniform resource locator (URL);
        execute one or more feature enrichment actions on the URL to identify one or more data points corresponding to the URL, wherein executing the one or more feature enrichment actions on the URL comprises crawling the URL to extract metadata for the URL and extracting information corresponding to one or more redirects of the URL, wherein the information comprises a number of URLs accessed before a crawl reaches a final URL;
        input, into a URL classification model, the one or more data points corresponding to the URL and the extracted information, wherein inputting the one or more data points corresponding to the URL and the extracted information causes the URL classification model to output a maliciousness score indicative of a degree to which the URL is malicious; and
        send, to the enterprise user device, a malicious score notification and one or more commands directing the enterprise user device to display the malicious score notification, wherein sending the one or more commands directing the enterprise user device to display the malicious score notification causes the enterprise user device to display the malicious score notification.

2. The computing platform of claim 1, wherein executing the one or more feature enrichment actions comprises extracting information indicating whether or not a protocol of the URL requires a secure connection.

3. The computing platform of claim 1, wherein extracting the information corresponding to the one or more redirects of the URL further comprises extracting one or more of: a number of redirects triggered a type of redirection or a number of hops.

4. The computing platform of claim 3, wherein outputting the maliciousness score by the URL classification model comprises:
    comparing the number of hops to a hop threshold;
    in response to identifying that the number of hops meets or exceeds the hop threshold, outputting a first maliciousness score indicating that the URL is malicious; and
    in response to identifying that the number of hops is less than the hop threshold, outputting a second maliciousness score indicating that the URL is legitimate.

5. The computing platform of claim 1, wherein executing the one or more feature enrichment actions comprises:
    extracting a domain age corresponding to the URL;
    comparing the domain age to a threshold domain age;
    if the domain age exceeds the threshold domain age, classifying the URL into a first category; and
    if the domain age does not exceed the threshold domain age, classifying the URL into a second category.

6. The computing platform of claim 1, wherein executing the one or more feature enrichment actions comprises extracting block rate information corresponding to the URL, wherein the block rate information indicates a number of times the URL was blocked and a number of times the URL was unblocked.

7. The computing platform of claim 1, wherein executing the one or more feature enrichment actions comprises extracting manual classification information corresponding to the URL.

8. The computing platform of claim 1, wherein executing the one or more feature enrichment actions comprises extracting information indicating whether one or more of an IPV4 or an IPV6 network address is present in a redirect chain for the URL.

9. The computing platform of claim 8, wherein outputting the maliciousness score by the URL classification model comprises:
    in response to identifying that one or more of the IPV4 or the IPV6 network address is present in the redirect chain for the URL, outputting a first maliciousness score indicating that the URL is malicious; and
    in response to identifying that neither the IPV4 or the IPV6 network address are present in the redirect chain for the URL, outputting a second maliciousness score indicating that the URL is legitimate.

10. The computing platform of claim 1, wherein the memory stores additional computer-readable instructions that, when executed by the at least one processor, cause the computing platform to:
    compare the maliciousness score to a predetermined maliciousness threshold; and
    based on identifying that the maliciousness score exceeds the predetermined maliciousness threshold, send one or more commands to a network computing device directing the network computing device to perform one or more network security actions, wherein sending the one or more commands directing the network computing device to perform the one or more network security actions causes the network computing device to perform the one or more network security actions.

11. A method comprising:
at a computing platform comprising at least one processor, a communication interface, and memory:
receiving, from an enterprise user device, a request to evaluate a uniform resource locator (URL);
executing one or more feature enrichment actions on the URL to identify one or more data points corresponding to the URL, wherein executing the one or more feature enrichment actions on the URL comprises crawling the URL to extract metadata for the URL and extracting information corresponding to one or more redirects of the URL, wherein the information comprises a number of URLs accessed before a crawl reaches a final URL;
inputting, into a URL classification model, the one or more data points corresponding to the URL and the extracted information, wherein inputting the one or more data points corresponding to the URL and the extracted information causes the URL classification model to output a maliciousness score indicative of a degree to which the URL is malicious; and
sending, to the enterprise user device, a malicious score notification and one or more commands directing the enterprise user device to display the malicious score notification, wherein sending the one or more commands directing the enterprise user device to display the malicious score notification causes the enterprise user device to display the malicious score notification.

12. The method of claim 11, wherein extracting the information corresponding to the one or more redirects of the URL further comprises extracting one or more of: a number of redirects triggered, a type of redirection or a number of hops.

13. The method of claim 11, wherein executing the one or more feature enrichment actions comprises:
extracting a domain age corresponding to the URL;
comparing the domain age to a threshold domain age;
in response to identifying that the domain age exceeds the threshold domain age, classifying the URL into a first category; and
in response to identifying that the domain age does not exceed the threshold domain age, classifying the URL into a second category.

14. The method of claim 11, wherein executing the one or more feature enrichment actions comprises extracting manual classification information corresponding to the URL.

15. The method of claim 11, wherein executing the one or more feature enrichment actions comprises extracting information indicating whether one or more of an IPV4 or an IPv6 network address is present in a redirect chain for the URL.

16. The method of claim 11, further comprising:
comparing the maliciousness score to a predetermined maliciousness threshold; and
based on identifying that the maliciousness score exceeds the predetermined maliciousness threshold, sending one or more commands to a network computing device directing the network computing device to perform one or more network security actions, wherein sending the one or more commands directing the network computing device to perform the one or more network security actions causes the network computing device to perform the one or more network security actions.

17. One or more non-transitory computer-readable media storing instructions that, when executed by a computing platform comprising at least one processor, a communication interface, and memory, cause the computing platform to:
receive, from an enterprise user device, a request to evaluate a uniform resource locator (URL);
execute one or more feature enrichment actions on the URL to identify one or more data points corresponding to the URL, wherein executing the one or more feature enrichment actions on the URL comprises crawling the URL to extract metadata for the URL and extracting information corresponding to one or more redirects of the URL, wherein the information comprises a number of URLs accessed before a crawl reaches a final URL;
input, into a URL classification model, the one or more data points corresponding to the URL and the extracted information, wherein inputting the one or more data points corresponding to the URL and the extracted information causes the URL classification model to output a maliciousness score indicative of a degree to which the URL is malicious; and
send, to the enterprise user device, a malicious score notification and one or more commands directing the enterprise user device to display the malicious score notification, wherein sending the one or more commands directing the enterprise user device to display the malicious score notification causes the enterprise user device to display the malicious score notification.

18. The one or more non-transitory computer-readable media of claim 17, wherein executing the one or more feature enrichment actions comprises extracting information indicating whether or not a protocol of the URL requires a secure connection.

19. The one or more non-transitory computer-readable media of claim 17, wherein extracting the information corresponding to the one or more redirects of the URL further comprises extracting one or more of: a number of redirects triggered, a type of redirection or a number of hops.

20. The one or more non-transitory computer-readable media of claim 17, wherein executing the one or more feature enrichment actions comprises:
extracting a domain age corresponding to the URL;
comparing the domain age to a threshold domain age;
if the domain age exceeds the threshold domain age, classifying the URL into a first category; and
if the domain age does not exceed the threshold domain age, classifying the URL into a second category.

* * * * *